United States Patent [19]

Denis et al.

[11] 4,209,484
[45] Jun. 24, 1980

[54] METHOD OF MANUFACTURING PRODUCTS OF CROSS-LINKED THERMOPLASTIC MATERIAL

[75] Inventors: Gérard M. Denis, Laxou; Bernard M. Ginglinger; Claude M. Rothamel, both of Pont-a-Mousson, all of France

[73] Assignee: Pont-A-Mousson S.A., Nancy, France

[21] Appl. No.: 878,105

[22] Filed: Feb. 15, 1978

[30] Foreign Application Priority Data

Feb. 28, 1977 [FR] France ............................ 77 05824
Aug. 1, 1977 [FR] France ............................ 77 23596

[51] Int. Cl.² .......................................... B29F 3/08
[52] U.S. Cl. .................................. 264/184; 264/209; 264/236; 264/210.2; 264/347; 425/71
[58] Field of Search ........... 264/209, 236, 347, 178 R, 264/184, 210 R; 425/71, 383, 381, 325

[56] References Cited

U.S. PATENT DOCUMENTS

| | | | |
|---|---|---|---|
| 2,971,221 | 2/1961 | Schoenbeck | 264/347 |
| 3,024,492 | 3/1962 | Antolino | 264/347 |
| 3,051,992 | 9/1962 | Bradley | 264/209 |
| 3,054,142 | 9/1962 | Hinderer et al. | 264/236 |
| 3,186,032 | 6/1965 | Harwood | 425/381 |
| 3,201,503 | 8/1965 | Benning et al. | 264/209 |
| 3,296,661 | 1/1967 | De Moustier | 264/209 |
| 3,456,294 | 7/1969 | Hood et al. | 425/381 |
| 3,591,674 | 7/1971 | Engel | 264/236 |
| 3,699,197 | 10/1972 | Egger | 264/178 R |

Primary Examiner—Jeffery R. Thurlow
Attorney, Agent, or Firm—Sughrue, Rothwell, Mion, Zinn and Macpeak

[57] ABSTRACT

The process comprises forming a mixture containing a thermoplastic material and a cross-linking agent and causing the mixture to enter a die head. A pressure is exerted on the mixture in the die head along the axis of the die head so as to sinter the mixture. The die head is heated to a temperature lower than the temperature at which the cross-linking agent becomes substantially decomposed so as to cause fusion of the mixture and produce a formed material. The formed material is passed through a bath of molten salt downstream of the die head. The temperature of the molten salt is such as to achieve the decomposition of the cross-linking agent and the cross-linking of the formed material. A device is described for carrying out the process.

9 Claims, 8 Drawing Figures

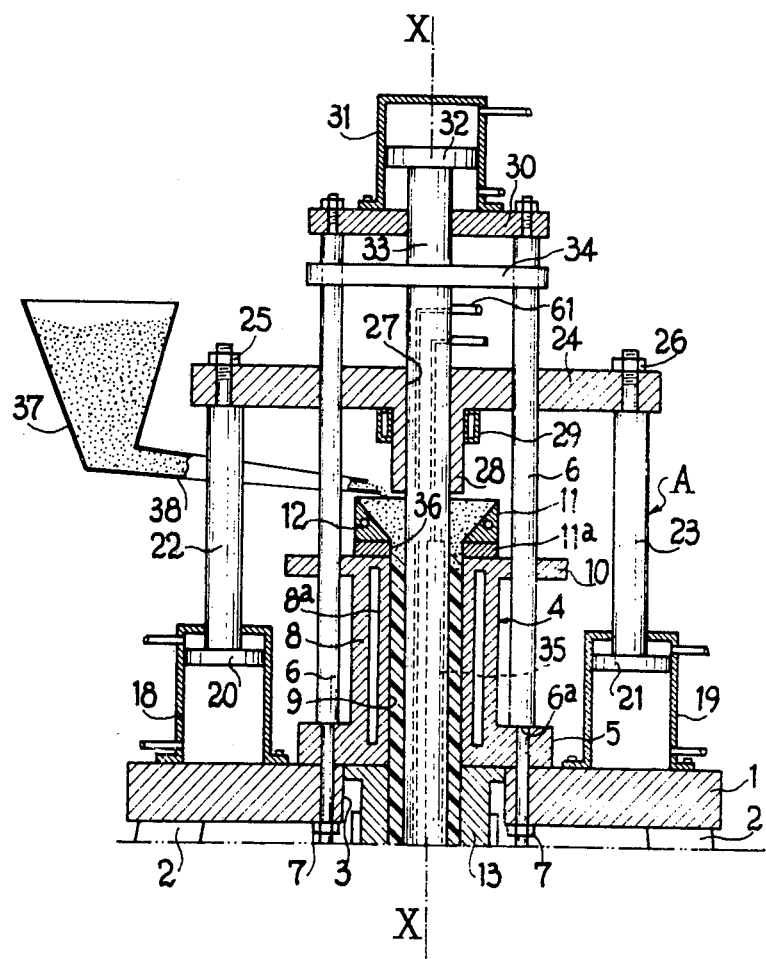
FIG_1A

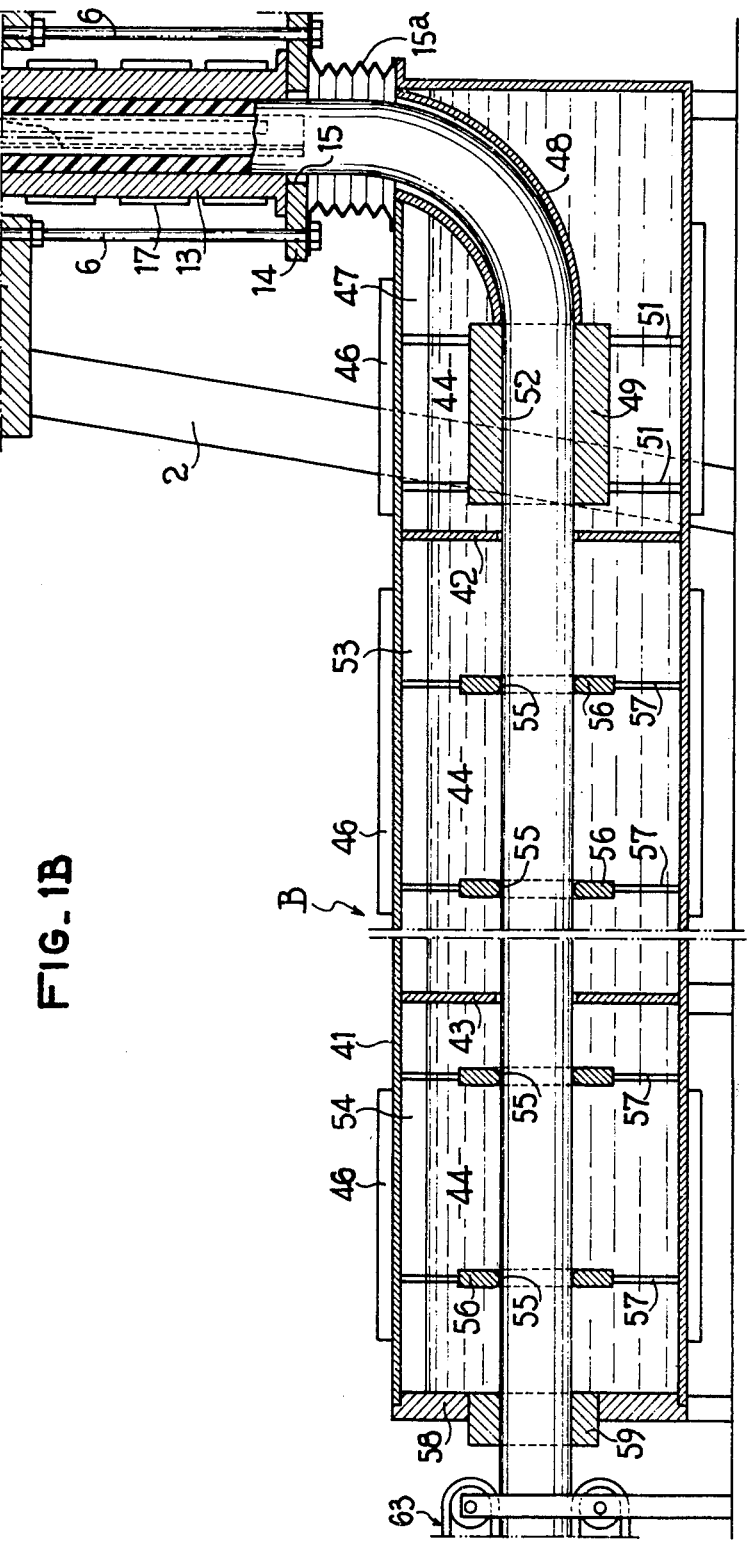

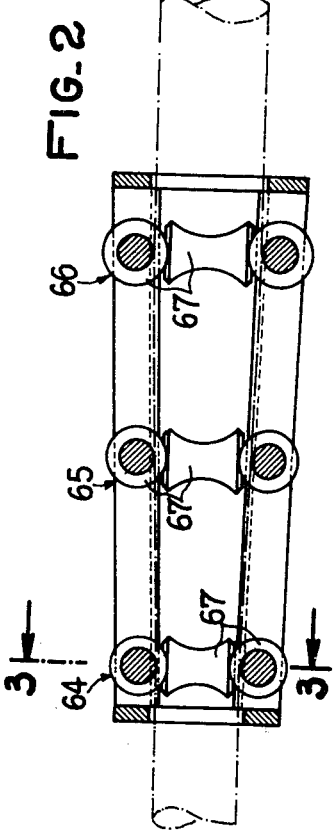
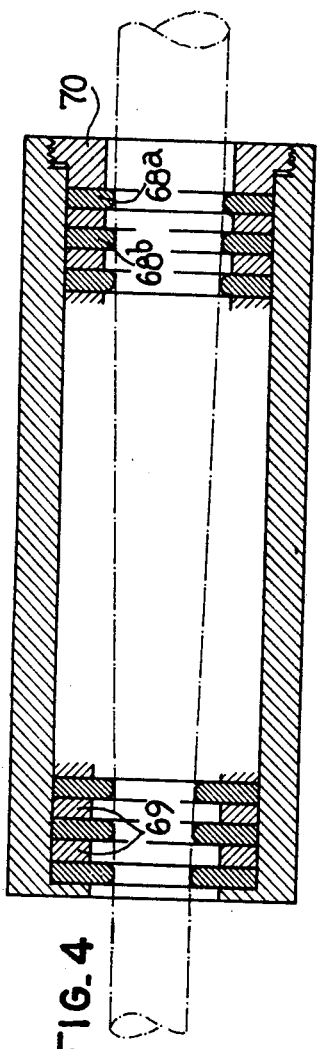
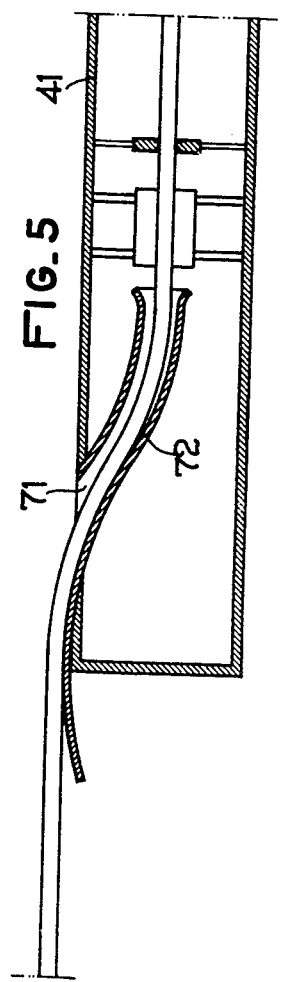

METHOD OF MANUFACTURING PRODUCTS OF CROSS-LINKED THERMOPLASTIC MATERIAL

The present invention relates to a process for manufacturing products of cross-linked thermoplastic material and to a device for carrying out said process. It concerns more particularly the manufacture of products of cross-linked high density polyethylene.

The cross-linking or vulcanization whereby two neighboring chains of polymer are joined and form a tridimensional network under the effect of a radiation or of activated carbon, is a known operation which may be applicable to polyolefins, vinyl polymers and elastomers, in particular to ethylene-propylene elastomers.

In the case of certain polyolefins, such as low-density polyethylene and ethylene-propylene elastomers, when an activated carbon coming from organic peroxide is employed as a cross-linking agent, the final product may be obtained without difficulty by in succession forming the starting powdered mixture, by the use of conventional methods for transforming plastics material, such as extrusion and injection, and cross-linking or vulcanizing which is carried out for example by passage of the formed product in an autoclave or through a fluidized bed. Indeed, the temperature at which the forming is carried out in the extruder or in the injecting press is distinctly lower than the temperature required to be reached for producing the cross-linking by decomposition of the organic peroxides conventionally employed, as for example:
dicumyl peroxide;
ditertiobutyl peroxide;
4-4bis-t-butyl-valerate peroxide; 2.5-dimethyl-2-5-di-(t-butyl)-hexane peroxide;
2.5-dimethyl-2.5-di-(t-butyl)-hexine-3 peroxide;

Between the forming stage during which the plastic material has a viscosity permitting the transformation thereof in accordance with conventional processes, and the cross-linking stage there is therefore an interval of temperature which is sufficient to insure that the two operations are well separated and that the risk of a premature decomposition of the peroxide is avoided.

This is not the case when it is required to cross-link high-density polyethylene since this material only reaches a sufficiently low viscosity for its forming by extrusion or injection at a temperature between 170° and 220° C., depending on the molecular weight of the high-density polyethylene, that is to say, a temperature higher than the temperature corresponding to the start of the decomposition of the peroxide (about 140° C. for the least active peroxides), so that the application to high-density cross-linked polyethylene of the processes employed for the production of objects of low-density polyethylene or ethylene-propylene elastomer objects would set off in the mixture subjected to the forming operation a cross-linking reaction which would be undesirable owing to the fact that, in particular in the case of an extruder, the material would then be subjected to a shearing which prevents the correct development of the cross-linking and results in a final product of very poor quality.

It has already been proposed to eliminate this shearing by the use of a heated forming and cross-linking die head in which the mixture is densified and constrained to travel in the tooling under the effect of a pressure created by a ram, but it is then necessary, in order to avoid harmful deformations within the material to provide, on the surfaces of the die head with which the material comes into contact a coating of an anti-adherent material such as polytetrafluoroethylene.

Indeed, good quality of the products has been observed in this case, but this method does not permit envisaging a practically continuous production since it is found that, after a relatively short period of the passage of the material, there is created in the cross-linking zone of the die head a deposit which has an adverse effect on the quality of the product. This deposit is constituted by particles of cross-linked polyethylene which adhere to the wall and is due to the radicals liberated in the course of the reaction which are sufficiently active to activate the surface of the anti-adherent material and result in an adhesion.

A large amount of lubricant has been tried by injecting it in the die head upstream of the zone of cross-linking, but this method—apart from difficulties which arise in the carrying out of the method owing to the unstable rate of flow of the fluid in the die head—does not permit eliminating the deposit in the cross-linking zone.

An object of the invention is to provide, for solving this problem, a process for manufacturing products of cross-linked thermoplastic material from a mixture which is essentially a powdered mixture containing the thermoplastics material and a cross-linking agent, comprising densifying the mixture by exerting thereon a pressure which causes it to penetrate and progress in the heated die head and cross-linking the material, wherein the powdered mixture is sintered by exerting thereon a pressure which is oriented along the axis of the die head and the fusion of the mixture is produced in the die head by subjecting the latter to a temperature lower than the temperature at which the cross-linking agent becomes substantially decomposed and, downstream of the die head, the cross-linking of the formed material is produced by passing it through a bath of molten salt the temperature of which permits the decomposition of the cross-linking agent.

Apart from the fact that the proposed process provides a prior stage for pre-forming the powdered mixture which permits a direct very advantageous admission thereof into the die head, it ensures that the forming stage proper, by sintering, is distinctly separate from the cross-linking stage. The term "sintering" encompasses the operation of densification and fusion of the particles to obtain a compact product. As concerns the use of a bath of molten salt to create the cross-linking reaction, it has for advantage that the product when gelled can as it were follow a free path in the cross-linking zone inasmuch as the thermal exchange is ensured by the liquid of the bath, and the product does not have to slide in contact with walls and that, in order to permit the progression thereof to the outlet, it is sufficient to provide a simple mechanical guiding which, in the case of a tube, can be achieved by a linear contact with the toric surface of rings which are supported by the tank containing the bath and moreover benefit from a lubricating effect within the liquid. However, it may be advantageous, in order to calibrate the product, to provide in the inlet region of the bath a forming-gauge the effective section of which may be constant or variable. If it concerns a tube, its inside diameter, which decreases in the region of the gauge, may be maintained within the required tolerances by the effect of an inert gas such as nitrogen which is injected into the tube.

In the application of the process to products of high-density polyethylene, the absence of any shearing in the course of the cross-linking permits the obtainment of optimal properties. The elongation upon fracture of the test pieces subjected to tension tests is between 400 and 500%. This result is independent of the time elapsed since the start of the production of the device owing to the fact that, in the cross-linking zone, no deposit is produced whose effect would lower the quality of the products. It is therefore possible to envisage a continuous production on an industrial scale, since there is no longer any need to frequently change parts deteriorated by a surface deposit which is a drawback of known processes.

The process proposed may be employed for the manufacture of tubes and section members and for providing sleeves on cables or metal reinforcements.

According to another feature of the process of the invention, the cross-linking of the formed material may be preceded by a drawing at a temperature in the neighbourhood of that of the forming. By drawing, it is intended to mean not only a longitudinal extension or elongation but also any forming by longitudinal and radial expansion achieved in particular under the effect of a punch or a die or under the effect of a fluid under pressure, which operation may be carried out within a mold or without use of a mold.

In this way, it is possible to manufacture with a single device tubes of different diameters with constant hourly outputs irrespective of the diameter, rings or section members etc. It is also possible to manufacture body parts, containers, packings, corrugated or thermoformed plates etc.

The device for carrying out the process comprises, upstream of a sintering die head, means for exerting along the axis of the die head a pressure on a cross-linkable powdered mixture to preform said mixture by compression and cause it to travel through the die head and, downstream of the die head, a tank for containing a bath of molten salt for the cross-linking of the sintered product leaving the die head.

The device according to the invention may moreover comprise, between the outlet of the die head and the cross-linking tank, means for drawing the formed material.

Further features of the invention will be apparent from the ensuing description with reference to the accompanying drawings in which:

FIGS. 1A and 1B together show a device for manufacturing cross-linked high-density polyethylene tubes;

FIG. 2 is an axial view of a modification of the shaping and gauging device employed in the device of FIG. 1B;

FIG. 3 is a sectional view taken on line 3—3 of FIG. 2;

FIG. 4 is an axial sectional view of another modification of the shaping and gauging device employed in the device of FIG. 1B;

FIG. 5 is an axial sectional view of a modified shape of the outlet end of the bath of molten salt of FIG. 1B employed for the cross-linking of the material of the tubes;

Figure 6:
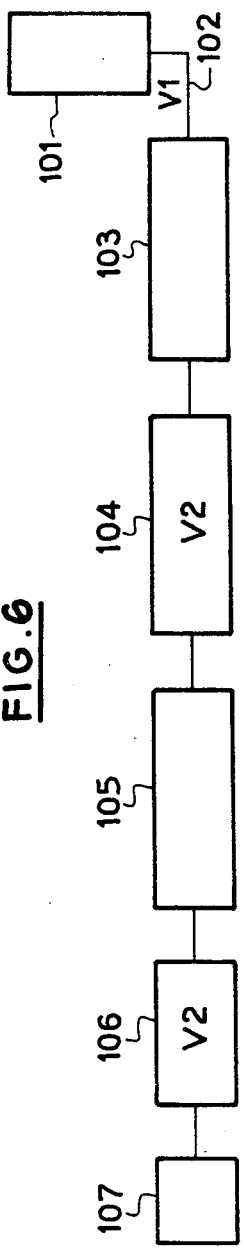
FIG. 6 is a diagrammatic view of a device comprising drawing means.

The device shown in FIGS. 1A and 1B comprises a vertical part A in which a powdered mixture containing a polyethylene and a cross-linking agent distributed in a homogeneous manner is formed as a tube and sintered, and a horizontal part B in which the cross-linking of the material is carried out.

The part A having a vertical axis X—X comprises a horizontal frame 1 which is supported by posts 2 and acts as a support for a die head 4 having an axis X—X and having a base plate 5 against which a shoulder $6^a$ of screwthreaded tie rods 6 is clamped by means of nuts 7 so that the base plate is fixed to the frame. The die head 4 comprises, parallel to its axis, a cylindrical body 8 in which there is formed a bore 9 of the die head 4 which is coaxial with a central bore 3 of the frame 1 and may be heated by a circulation of oil at $8^a$. The upper end of the die head 4 has a flange 10 through which the tie rods 6 extend and whose upper face supports a supply hopper 11 which may be cooled by a circulation of water at 12 and whose bottom opening has a diameter which corresponds to that of the bore 9. Interposed between the hopper 11 and the flange 10 is a metal ring $11^a$ which is neither cooled nor heated and whose surfaces of contact are notched so as to reduce the transmission of heat.

Disposed vertically against the base plate 5 of the die head 4 and inside the bore 3 of the frame 1 is a die head 13 which is coaxial with the die head 4 and maintained in position by means of a lower support plate 14 fixed to the tie rods 6.

This plate is provided with an opening 15 the diameter of which is slightly greater than that of the bore of the die head 13. The assembly thus forms, from the bottom of the hopper 11 to the opening 15 of the support plate 14, a rectilinear cylindrical conduit or passageway. The die head 13 is also provided with annular heating means, for example formed by outer electric resistances 17.

The frame 1 acts as a support outside the die head 4 for two jack cylinders 18, 19 containing pistons 20, 21 on the vertical rods 22, 23 of which is fixed a horizontal plate 24 by nuts at 25, 26. The plate 24 is slidable on the tie rods 6 and has in the center an opening 27 which is vertically downwardly extended within an annular boss 28 which is in one piece with the plate 24 and constitutes a piston which is cooled in the vicinity of the plate 24 by a water manifold 29 and cooperates with the cylinder portion formed by the opening of the ring $11^a$ and by the upper part of the wall of the bore 9 of the die head 4.

The tie rod 6 support at their upper end, above the plate 24, a plate 30 on which bears a jack cylinder 31 containing a piston 32 integral with a mandrel or vertical plunger 33 which is engaged in sliding contact in the opening 27 of the piston 28 and guided by the plate 30 and a horizontal plate 34 which is integral with the mandrel and slidable on the rods 6.

The mandrel 33 extends inside the die head 4 and the die head 13, the end of the travel in the upward direction of its lower end being located roughly at the level of the lower end of this die head 13. The mandrel also has a heating element 35 containing a circulation of oil or an electric heating resistance.

The device is supplied by a metering tank 37, connected to the hopper 11 by a spout 38, which must insure a homogeneous distribution of the powder in the gap between the mandrel 33 and the die head 4. The cooling conduit 12 for the hopper permits insuring that the polyethylene, irrespective of the duration of its stay in the hopper, cannot reach a temperature at which it would become coherent under the effect of the beginning of a fusion.

The cooled zone is indeed a preforming zone the height of which is of the order of twice the diameter of the mandrel 33 and in which the mixture must remain in powdered form so that it can be shaped in the form of a tube under the action of the densification achieved by the piston 28 in the tubular part 36 formed above the die head 4 and possibly in the inlet of the latter.

At the start of a cycle, the piston 28 and the mandrel 33 are in their upper positions. No pressure is exerted on the piston 32 of the jack 31. Owing to the action of the jacks 18, 19, the piston 28 is made to descend and travel through the powdered mixture placed in the hopper 11 where it is maintained at the ambient temperature by the cooling conduit 12. In continuing to descend, the piston 28 renders the mixture compact in the tubular part 36. The pressure required for this compacting is of the order of 1000 bars. The mixture is therefore formed or shaped and simultaneously rendered more dense. It is thereafter driven into the die head. The plunger 33 undergoes simultaneously a descending motion under the effect of the driving of the material which is then subjected in the die head 4 to a rise in temperature created by the heating element 8 of the die head 4 and the heating element 35 of the mandrel 33. The temperature is regulated at the value which produces the fusion of the material but remains lower than the temperature at which decomposition of the cross-linking agent becomes substantial. This temperature will be for example between 150° and 180° C. When the piston 28 reaches the lower end of its travel, the pressure acting on the pistons 20, 21 of the jacks 18, 19 is reduced and, while the piston 28 is maintained in the lower position, the mandrel 33 is raised by means of the piston 32. When the mandrel has reached its upper position the piston 28 is in turn raised and a new cycle commences.

The die head 4 therefore constitutes a sintering zone from which the material is urged, owing to the descending movement of the piston 28 along the mandrel 33, into the die head 13 where the temperature is maintained at the same level as before and from which it issues in the form of a blank. At the outlet of the die head 13, the blank is urged by the descending movement of the piston 28 into a sleeve 15$^a$, for example in the form of a bellows, where the temperature is maintained roughly at the same level as before, or, as the case may be, is brought to a higher value and which constitutes a zone of transition in which the blank, which is free with respect to the wall of the sleeve 15$^a$, can undergo lateral movements absorbing the jerks in its progression, bearing in mind the continuous pull which is exerted thereon on the downstream side adjacent the part B which constitutes a cross-linking zone.

The part B comprises essentially a closed horizontal preferably cylindrical vessel 41 which is divided longitudinally into compartments by two vertical partition walls 42, 43 and contains a bath 44 of molten salt and is heated for example by means of electric resistances 46 to a temperature permitting the cross-linking, that is to say higher than 200° C. In the upstream compartment 47 there penetrates a tubular connection 48 the upper end of which is wide and fixed to the tank 41 whereas its other end, the inside diameter of which is narrower, corresponds to the outer section of the tubes to be cross-linked and is fixed to the inlet end of a shaping and gauging device 49 supported by the wall of the tank 41 by members 51. The sintered tube is engaged with clearance in the inlet end of the connection 48 whose section narrows and enters, after a change of direction of 90°, a cylindrical bore 52 formed in the shaping and gauging device 49 which thereby ensures a shaping of the profile and a uniform surface condition of the tube which simultaneously undergoes a cross-linking at least in its peripheral surface portion.

The tube thereafter travels through the other two compartments 53, 54 in which the cross-linking is finished and where it is guided by rings 56 which are integral with the wall of the tank through supports 57 and whose internal opening 55 has a toric shape resulting in a sliding contact of linear type with the tube. The cross-linked tube issues from the end wall 58 of the tank by passing through an attached ring 59 which is in sealed contact therewith.

Also contributing toward a calibration of the tube immersed in the part 44 is the pressure of a gas which is maintained under pressure in the bore of the tube and supplied by a pipe 61 through an axial conduit 62 provided in the mandrel 33. The gas employed is preferably nitrogen.

The molten salt constituting the bath 44 is advantageously an eutectic mixture of mineral salts, for example nitrates and nitrites such that the eutectic has the following composition:
53 parts by weight of $KNO_3$
40 parts by weight of $NaNO_2$
7 parts by weight of $NaNO_3$.

The partitioning of the tank 41 permits establishing different temperatures in the different compartments. The temperature is normally higher, for example between 250° and 300° C., in the compartment 47 containing the shaping and gauging device 49 so as to obtain a rapid transformation of the material in the peripheral region of the tube. It will be lower in the other compartments 53, 54, namely, for example, at the most equal to 250° C. so as to avoid risk of a thermal degradation of the product.

For the treatment of a tube 3 mm thick, the length of the tank 41 may be about 2 m with a speed of displacement of the tube which is in this case 150 m/hour.

Reference 63 designates a device shown diagrammatically and partly constituted by two moving tracks in contact with the cross-linked tube for exerting a continuous pull on the latter.

An additional shaping and gauging device may be provided beyond the pulling device 63, or between the latter and the tank 41.

Satisfactory tests have been carried out by employing as thermoplastic material a high-density polyethylene having a molecular weight between 300,000 and 500,000, for example a PHILIPS polyethylene commercially available under the trademark "MANOLENE 56 020" having a density of 0.956 and a viscosity index equal to 2 under a load of 20 kg/sq.cm.

In the mixture there have been incorporated in a homogeneous manner additives comprising, apart from an organic peroxide, coloring agents, anti-oxidizers, anti-U.V. agents, lubricants, all of which are known products employed in the industry of transformation of plastics materials. As cross-linking agent, there has been employed in particular a catalyzed formula having 0.5% of ditertiobutyl peroxide commercially available under the name "TRIGONOX B".

In this case, the procedure comprises 70 piston strokes per minute and, for a total travel of the piston of 40 mm, the length of tube produced is about 20 mm, the displacement of the mandrel being from 20 to 25 mm.

Tests have been carried out in the course of which the elongation is measured between two references of a standard test piece ISO ⅓, by means of an extensometer in accordance with the French standard NF T 51 034, the rate of the traction being 1000 mm/minute. Results of the tension tests which reveal the mechanical characteristics measured on a tube as a function of the extruded length and reproduce the mean value for five test pieces, are shown in the following table:

| Extruded length (m) | 100 | 500 | 1000 | 1500 | 2000 |
|---|---|---|---|---|---|
| Stress on the threshold of yield (in kg/sq.cm) | 180 | 184 | 170 | 190 | 182 |
| Stress upon fracture (in kg/sq.cm) | 300 | 280 | 290 | 270 | 280 |
| Elongation to fracture (%) | 520 | 490 | 460 | 500 | 470 |
| Bursting pressure of tubular test pieces (bars) | 55 | 52 | 57 | 50 | 52 |

FIGS. 2 and 3 show a shaping and gauging device employed instead of the gauge 49 of FIG. 1B and consisting of a plurality of groups 64, 65, 66 of profiling rolls 67 having a concave profile which impart to the tube a progressively decreasing section.

To obtain a decrease in the desired diameter, it is also possible to employ a gauge such as that shown in FIG. 4 comprising a succession of forming rings $68^a$, $68^b$ having a cylindrical bore of different diameters. These rings of Teflon or polished steel are separated by spacer members 69 and maintained in position by a clamping device 70, if desired completed by a system for taking up play (not shown).

In FIG. 5, the final product, which is for example an unclosed section member, instead of issuing from the tank 41 by passing through a sealing device of the end wall, is extracted through an upper opening 71 of the wall of the tank through which it is guided by a guide 72.

In the case where the product does not have a tubular shape, the mandrel 32 of FIG. 1A is eliminated. If the purpose is to place a sleeve on a cable or reinforcement, this cable or reinforcement replaces the mandrel 33.

In the diagram shown in FIG. 6, the reference numeral 101 designates a forming device corresponding to the part A of FIGS. 1A and 1B which produces a tubular blank 102 at a speed v1; the blank passes through a tank 103 in which it is subjected to drawing and then cross-linking operations, then it enters in succession a drawing device 104 driving it at a speed v2 higher than the speed v1, a cooling tank 105, a drawing device 106 driving it at the same speed v2 as before or substantially equal to this speed v2 and a winding device 107.

Figure 7:
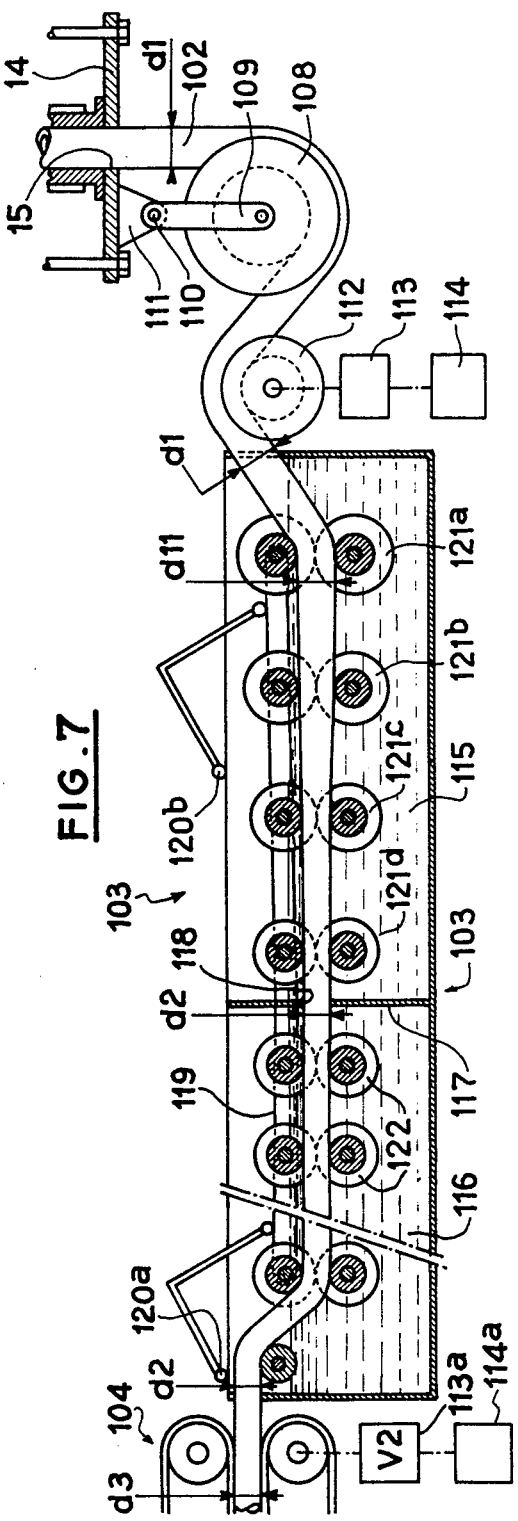
FIG. 7 is a longitudinal sectional view of the drawing and cross-linking means employed in the device of FIG. 6.

As shown in FIG. 7, the blank 102 issues from the forming device 101 by way of an opening 15 of the lower support plate 14. It therefore passes into a device for eliminating the jerks due to the discontinuity of the advance of the blank, and enters the tank 103 in a continuous manner. An embodiment of such a device is shown in FIG. 7. In this device, the blank 102 undergoes a change of direction around a grooved pulley 108 which is freely rotatable on a stirrup 109 which is pivotable in a vertical plane about a pin 110 mounted on a support 111. The groove of the pulley 108 has a depth equal to the radius of the blank 102.

The tubular blank 102 then passes around a grooved drive pulley 112 connected through a speed variator 113 to an electric motor 114 (shown diagrammatically).

The blank in this way undergoes a new change in direction which brings it into a drawing and cross-linking tank 103. This tank contains a mixture of molten salts of the same type as that of the tank 41 of FIG. 1B distributed in two compartments, namely a drawing compartment 115 and a cross-linking compartment 116 separated by a diaphragm 117 having an opening 118 allowing the blank 102 to pass therethrough.

Inside the tank 103, in the compartment 115, there are mounted a plurality of forming or profiling rolls 121a, 121b, 121c and 121d, the profile of which matches the configuration of the drawn product. All of the rolls are mounted on an actuating rod 119 mounted on pivotal connections 120a and 121b. The cross-linking compartment 116 has maintaining rolls 122. If desired, the forming rolls may be replaced by other suitable forming devices. The number of roll sets or forming devices may vary, depending on the desired drawing rate. The maintaining rolls may be if desired replaced by any other guiding and supporting device, such as troughs, rings etc . . . .

After having passed through the tank 103, the blank 102 is driven by a pulling device 104 of known type, for example having belts driven at the speed v2>v1 by a unit comprising a motor 114a and speed variator 113a shown diagrammatically. The blank then enters the cooling tank 105 before being wound onto a reel 107, after having passed if desired through another pulling device 106 which may be of the same type as the pulling device 104 and which rotates at a speed equal to or in the neighborhood of v2. This pulling device is adapted to facilitate the extraction of the tube and in no way produces a further reduction in the section.

The blank 102 issues from the forming device 101 in a discontinuous motion, the stopping time corresponding to the return of the forming mandrel, then it is driven in a continuous manner to the other devices of the installation by the drive pulley 112 the linear speed of which is v1. The balancing of the freely-rotative pulley 108 about its pin 110 compensates for the absence of supply of material during the blank stopping times. The diameter of the blank reaches at this moment a value d1 and this is maintained owing to a gas pressure within the blank which precludes the collapse of the wall of the blank.

The blank having the diameter d1 therefore enters the drawing compartment 115 at the speed v1. The following drawing device 104, whose linear speed v2 is chosen to be higher than v1, then produces its effect and the blank is drawn longitudinally. Its diameter is reduced to a value d11 which is slightly less than d as soon as it reaches the first set of rolls 121a and its diameter reaches a value d2, substantially less than d1, at the outlet of the tank 15 owing to this longitudinal drawing. The forming rolls 121a to 121d support the blank 102 whereas the cross-linking has not yet occurred. The temperature in the drawing compartment 115 is so chosen that the half-life of the catalyst has still a large duration. It is in the neighborhood of that of the forming in the forming device, for example of the order of 160° to 190° C.

In the region of the opening 118 of the diaphragm 117, the blank has dimensional characteristics (diameter, thickness) which are homothetic with those it had when it entered the drawing compartment 115. It then enters the cross-linking compartment 116 where the temperature reaches values higher than 200° C. and preferably between 220° and 250° C. The decomposition of the catalyst then produces the cross-linking of the material and the drawing phenomenona is stopped by the cross-linking.

The position of the diaphragm 117 in the tank 103 depends on the desired diameter of the tube at the outlet of the cross-linking compartment 116, this diameter being determined by the speed ratio v2/v1. Likewise, the different rolls 121a, 121b, 121c, 121d are chosen in consequence since their configuration must adapt itself as precisely as possible to the profile to be obtained should this profile be different from the blank 102 issuing from the forming device. But if the profile to be obtained remains a smooth tube homothetic with the tubular blank 102, the rolls 121a, 121b, 121c, 121d no longer have a gauging or shaping function but merely support and guide the tube. They may be replaced by any like means. In any case, the rolls 122 which only serve to support and guide the tube in the course of its cross-linking may also be replaced by any like means for supporting and guiding.

At the outlet of the tank 103 and after passage through the drawing device 104, the tube is cooled in the tank 105 containing for example water. It is then taken up by the pulling device 106 and wound by the winder 107.

A remarkable property of the product thus drawn and cross-linked is its dimensional stability and the absence of elastic memory or shrinkage.

For example, a section member of polyethylene, drawn four times in the drawing compartment 115 then cross-linked in the cross-linking compartmet 116, undergoes no shrinkage other than the thermal shrinkage. The cross-linking blocks the drawn chains with respect to each other. The cross-linked product is bi-refringent but stable in its dimensions above and below the temperature of fusion of the polyethylene crystallites, apart from the expansion in volume.

On the other hand, the same section member drawn four times in the compartment 115 then merely cooled instead of being cross-linked, resumes its original dimensions by the effect of the elastic memory as soon as its temperature is brought again to the neighborhood of 140° C. which is higher than the temperature of fusion of the polyethylene.

The following examples to which the invention is not intended to be limited are given by way of illustration of the invention with reference to the process represented in FIGS. 6 and 7.

EXAMPLE 1

High density-polyethylene having a molecular weight of between 300,000 and 500,000, such as that commercially available under the trademark "MANOLENE 56 020", was employed for forming a tube under the foregoing conditions.

Additives were added which comprise, apart from the stabilizers and coloring agents of known types, a cross-linking agent which is 2.5-dimethyl-2.5-(ditertiobutyl-peroxy)-hexine-3, sold under the name "LUPEROX 130". The operational conditions for different diameters starting with a blank diameter of d1=27.5 mm are given in the following Table I:

TABLE I

| Test piece | speed v1 mh | speed v2 2nd drawing device mh | Output from extruder outlet kg/h | Drawing temperature °C. | Temperature of cross-linking compartment °C. | outside diameter d2 of the tube issuing from tank 115 mm | outside diameter d3 of the tube on reel mm | thickness mm | weight g/m |
|---|---|---|---|---|---|---|---|---|---|
| 1 | 35.4 | 140 | 9.1 | 185 | 220 | 18 | 17.30 | 1.03 | 60.6 |
| 2 | 35.4 | 140 | 9.1 | 180 | 220 | 17 | 16.68 | 1.02 | 54 |
| 3 | 35.4 | 180 | 9.1 | 175 | 230 | 16.5 | 15 | 0.90 | 48 |
| 4 | 35.4 | 210 | 9.1 | 175 | 240 | 15.4 | 14.50 | 0.90 | 41.6 |

The diameter d3 is slightly less than the diameter d2. This does not result from a drawing but merely from a cooling shrinkage at the outlet of the salt bath of the tank 103.

EXAMPLE 2

Other tests were carried out with the same mixture as in Example 1, the different parameters having the following values:
v1=36.6 m/hour
v2=133 m/hour
d1=27.5 mm
d2=18.5 mm
temperature of the drawing compartment: 180° C.
temperature of the cross-linking compartment: 230° C.

There was then obtained a tube having a diameter of 16 mm at the start and at the end of the extrusion and a length of 2,000 m. This tube was subjected to tension tests the results of which are given in the following Table II:

| | Test piece | Stress at the threshold of yield kg/sq.cm | Stress upon fracture kg/sq.cm | Elongation upon fracture % |
|---|---|---|---|---|
| Start | 1 | 173 | 214 | 390 |
| | 2 | 172 | 166 | 325 |
| | 3 | 172 | 213 | 400 |
| | 4 | 172 | 209 | 360 |
| End | 5 | 176 | 219 | 370 |
| | 6 | 169 | 223 | 380 |

The cross-linking rate was 87% at the start and at the end and the shrinkage at 120° C., measured in accordance with the French Standard NF T 54 021, was 4%. The shrinkage at 160° C. measured in accordance with the same standard was 6%.

The process of the invention is in particular applicable to polyolefins which are cross-linkable by peroxide and of particular interest for products of a high molecular weight; for example for the grades lower than 2.

It is also applicable to low-density polyethylene which is rendered cross-linkable by the addition of a peroxide.

Having now described our invention what We claim as new and desire to secure by Letters Patent is:

1. A process for producing long products of cross-linked high-density polyethylene having a molecular weight of at least 200,000, comprising forming a mixture which is essentialy a powdered mixture containing said polyethylene and a cross-linking agent, charging the mixture into a heated substantially cylindrical die head, exerting a pressure on the mixture in the die head in a direction along the axis of the die head so as to sinter the mixture in a sintering region of the die head while maintaining the sintering region of the die head at a temperature lower than the temperature at which the cross-linking agent becomes substantially decomposed but sufficient to cause fusion of the mixture and produce a formed material, and constraining the formed material issuing from the die head to enter a bath of molten salt located downstream of the die head relative to the travel of the formed material by first driving means located adjacent an inlet end of the bath and engaged with the formed material and second driving means located adjacent an outlet end of the bath and engaged with the formed material, the bath of molten salt having a temperature which causes the decomposition of the cross-linking agent and the cross-linking of the formed material in a cross-linking region of the bath, said second driving means driving the formed material at a rate which is higher than the rate at which the first driving means drives the formed material whereby the formed material is stretched upstream of said cross-linking region of the bath so that the formed material assumes the desired cross-sectional size before it is cross-linked.

2. A process as claimed in claim 1, wherein the axial pressure exerted on the mixture is exerted by piston means and is of the order of 1000 bars.

3. A process as claimed in claim 1, wherein the temperature of the sintering region is between 150° and 180° C.

4. A process as claimed in claim 1, wherein the temperature of the cross-linking region is between 200° and 300° C.

5. A process as claimed in claim 1, wherein the bath of molten salt comprises two compartments, the temperature of the molten salt in the compartment adjacent the outlet end being the cross-linking temperature whereas the temperature of the molten salt of the compartment adjacent the inlet end is lower than the cross-linking temperature.

6. A process as claimed in claim 1, comprising shaping and calibrating the formed material in a region between the cross-linking region and the die head.

7. A process as claimed in claim 1, wherein the stretching of the formed material occurs in a region having a temperature in the neighborhood of the temperature of the forming of the material in the die head before the cross-linking of the formed material.

8. A process as claimed in claim 7, wherein said region is in a bath of molten salt.

9. A process for producing long products of cross-linked high-density polyethylene having a molecular weight of at least 200,000, comprising forming a mixture which is essentially a powdered mixture containing said polyethylene and a cross-linking agent, charging the mixture into a heated substantially cylindrical die head, exerting by reciprocating piston means a pressure on the mixture in the die head in a direction along the axis of the die head so as to sinter the mixture in a sintering region of the die head while maintaining the sintering region of the die head at a temperature lower than the temperature at which the cross-linking agent becomes substantially decomposed but sufficient to cause fusion of the mixture and produce a formed material, and constraining the formed material issuing from the die head to change direction and form a loop portion to accommodate the irregular rate of flow of the formed material through the die head owing to the reciprocating action of the piston means, and thereafter constraining the formed material to enter a bath of molten salt located downstream of the die head relative to the travel of the formed material by first driving means located adjacent an inlet end of the bath and engaged with the formed material and second driving means located adjacent an outlet end of the bath and engaged with the formed material, the bath of molten salt having a temperature which causes the decomposition of the cross-linking agent and the cross-linking of the formed material in a cross-linking region of the bath, said second driving means driving the formed material at a rate which is higher than the rate at which the first driving means drives the formed material whereby the formed material is stretched upstream of said cross-linking region of the bath so that the formed material assumes the desired cross-sectional size before it is cross-linked.

* * * * *